(12) United States Patent
Frazier et al.

(10) Patent No.: US 6,968,555 B2
(45) Date of Patent: Nov. 22, 2005

(54) MULTI-LAYER SOFTWARE ARCHITECTURE FOR HARDWARE CONTROL

(75) Inventors: Brian Edward Frazier, Santa Rosa, CA (US); Keith Jeffrey Sutton, Santa Rosa, CA (US); Thanh Thien Nguyen Heyman, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 753 days.

(21) Appl. No.: 09/825,654

(22) Filed: Apr. 4, 2001

(65) Prior Publication Data

US 2002/0147854 A1 Oct. 10, 2002

(51) Int. Cl.[7] ............................................. G06F 9/312
(52) U.S. Cl. ..................................... 719/316; 719/320
(58) Field of Search .............................. 719/310–320, 719/328; 713/1, 2, 100; 707/103 R; 717/108; 714/25–57; 712/220

(56) References Cited

U.S. PATENT DOCUMENTS

| | | | | |
|---|---|---|---|---|
| 5,574,922 A | * | 11/1996 | James ........................ 712/220 |
| 5,862,052 A | * | 1/1999 | Nixon et al. ................... 713/1 |
| 5,887,169 A | * | 3/1999 | Lacombe ..................... 719/311 |
| 6,028,998 A | * | 2/2000 | Gloudeman et al. ......... 717/108 |
| 6,119,125 A | * | 9/2000 | Gloudeman et al. ..... 707/103 R |

* cited by examiner

Primary Examiner—St. John Courtenay, III

(57) ABSTRACT

A software system having a multi-layer architecture for controlling a hardware system including a latch layer, a hardware control layer, an access layer, and an orchestration layer. The latch layer includes a latch object for each of a set of control points of the hardware system. Each latch object provides a common interface in the software system for accessing the corresponding control point. The hardware control layer includes a hardware control object for each of a set of sub-portions of the hardware system. Each hardware control object coordinates accesses to the control points of the corresponding sub-portion through the latch layer. The access layer includes an access object for each of a set of groupings of the sub-portions. Each access object coordinates accesses to the corresponding grouping of the sub-portions. The orchestration layer includes an orchestration object for each of a set of functional features of the hardware system. Each orchestration object provides a common interface in the software system for accessing a corresponding grouping of the access objects which are associated with the corresponding functional feature.

17 Claims, 4 Drawing Sheets

MULTI-LAYER SOFTWARE ARCHITECTURE FOR HARDWARE CONTROL

BACKGROUND OF THE INVENTION

1. Field of Invention

The present invention pertains to the field of software control of hardware. More particularly, this invention relates to a multi-layer software architecture for hardware control.

2. Art Background

A wide variety of systems include hardware which is controlled by software. Software that controls hardware is commonly referred to as firmware. For example, a wide variety of instruments including those used in test and measurement applications commonly include circuits for generating test signals and/or circuits for obtaining measurements along with firmware for controlling the circuits.

A circuit in such a system typically includes one or more control points that enable software to control a circuit by writing values to the control points of the circuit. The control points may be implemented as registers and/or digital-to-analog converters, etc.

It is common to make hardware changes to a system when performing support or upgrade operations on the system. Hardware changes to a system may involve modification to its circuits, replacement of its circuits, and/or the addition of circuits. Such hardware changes typically require modifications to the firmware that controls the circuits.

Prior firmware systems may grow quite large and complex as the number and complexity of circuits being controlled increases. In addition, the firmware code that directly accesses the control points of circuits is usually scattered haphazardly throughout numerous portions of a firmware system. These factors typically complicate the task of performing firmware modifications. For example, it is common to undertake a search through large amounts of code to find references to the control points that require modification. Unfortunately, such methods of performing firmware modification are usually time consuming and can greatly increase the time and cost of upgrading a system and may introduce faults into the firmware.

SUMMARY OF THE INVENTION

A software system having a multi-layer architecture for controlling a hardware system is disclosed. The multi-layer architecture includes a latch layer, a hardware control layer, an access layer, and an orchestration layer. The latch layer includes a latch object for each of a set of control points of the hardware system. Each latch object provides a common interface in the software system for accessing the corresponding control point. The hardware control layer includes a hardware control object for each of a set of sub-portions of the hardware system. Each hardware control object coordinates accesses to the control points of the corresponding sub-portion through the latch layer. The access layer includes an access object for each of a set of groupings of the sub-portions. Each access object coordinates accesses to the corresponding grouping of the sub-portions. The orchestration layer includes an orchestration object for each of a set of functional features of the hardware system. Each orchestration object provides a common interface in the software system for accessing a corresponding grouping of the access objects which are associated with the corresponding functional feature.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
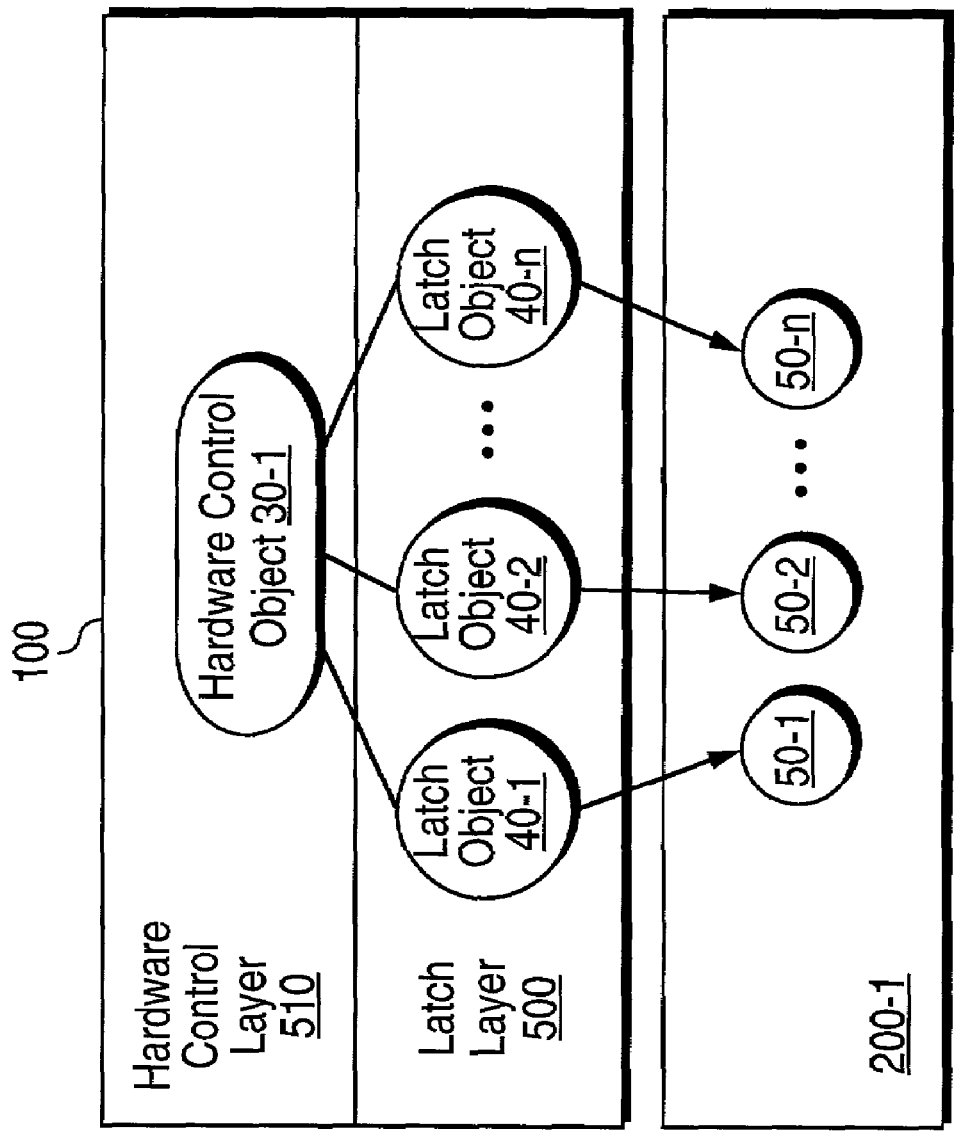
FIG. 1 shows one embodiment of a software system according to the present teachings which includes a set of latch objects grouped by a hardware control object.

FIG. 1 shows one embodiment of a software system 100 according to the present teachings. The software system 100 controls a hardware subsystem 200-1 which may be a sub-portion of a hardware system. The hardware subsystem 200-1 includes a set of control points 50-1 through 50-n for controlling the functionality of the hardware subsystem 200-1.

The software system 100 includes a set of latch objects 40-1 through 40-n which share a common interface and form a latch layer 500. The latch objects 40-1 through 40-n may share a similar responsibility with respect to the control points 50-1 through 50-n.

The latch objects 40-1 through 40-n correspond to the control points 50-1 through 50-n, respectively. The latch objects 40-1 through 40-n encapsulate and provide common interfaces to the corresponding control points 50-1 through 50-n, respectively. For example, the latch object 40-1 encapsulates and provides a common interface to the control point 50-1 and the latch object 40-2 encapsulates and provides a common interface to the control point 50-2, etc.

Each latch object 40-1 through 40-n provides a wrapper and locking mechanism around a physical address associated with the corresponding control point 50-1 through 50-n. For example, the latch object 40-1 provides a wrapper and locking mechanism around the physical address associated with the control point 50-1 and the latch object 40-2 provides a wrapper and locking mechanism around the physical address associated with the control point 50-2, etc.

In one embodiment, each latch object 40-1 through 40-n is an object implemented as a $C^{++}$ class and its common interface includes a set of methods. The methods include a change_state( ) method for altering the corresponding control point 50-1 through 50-n. For example, the change_state( ) method of the latch object 40-1 takes as an argument a value to be applied to the control point 50-1 and the change_state( ) method of the latch object 40-2 takes as an argument a value to be applied to the control point 50-2. Each latch object 40-1 through 40-n uses a $C^{++}$ locking mechanism to lock the physical address associated with the corresponding control points 50-1 through 50-n.

The implementation of the latch objects 40-1 through 40-n are adapted to the particular hardware implementation of the underlying control points 50-1 through 50-n and insulate higher objects of the software system 100 from these particulars. For example, an alteration of the circuitry associated with the control point 50-2 can be accommodated by a modification to the latch object 40-2 rather than modifications to other portions of the software system 100.

The software system 100 includes a hardware control object 30-1 that encapsulates and provides a common interface for controlling the hardware subsystem 200-1. The hardware control object 30-1 provides a hardware control layer 510 in the software system 100. The hardware control object 30-1 coordinates the latch objects 40-1 through 40-n.

The hardware control object 30-1 includes a set of methods which are adapted to provide a set of hardware functions associated with the hardware subsystem 200-1 according to the underlying hardware implementation. The methods in the hardware control object 30-1 are adapted to calculate values to be applied to the control points 50-1 through 50-n and call the change_state( ) methods of the latch objects 40-1 through 40-n when appropriate. Code in higher objects of the software system 100 call the methods of the hardware control object 30-1 when accessing the hardware functions provided by the hardware subsystem 200-1. In one embodiment, the hardware control object 30-1 is an object implemented as a $C^{++}$ container class for the latch objects 40-1 through 40-n.

In some embodiments, the latch objects 40-1 through 40-n are grouped together using the hardware control object 30-1 because the control points 50-1 through 50-n may have interdependencies with respect to one another. The nature of the interdependencies among the control points 50-1 through 50-n may depend on the particular application-specific function of the hardware subsystem 200-1. One example of an interdependency between a pair of control points is one in which the valid range of values for one depends on the value of the other. The coding of the methods in the hardware control object 30-1 are adapted to the interdependencies and shield higher levels of the software system 100 from having to adapt to the interdependencies. An alteration or replacement of the hardware subsystem 200-1 including changes in the interdependencies among the control points 50-1 through 50-n can be accommodated by a modification to the hardware control object 30-1 rather than modifications to other portions of the software system 100.

In some embodiments, the hardware control object 30-1 may include files having calibrated data to be applied to the control points 50-1 through 50-n.

Figure 2:
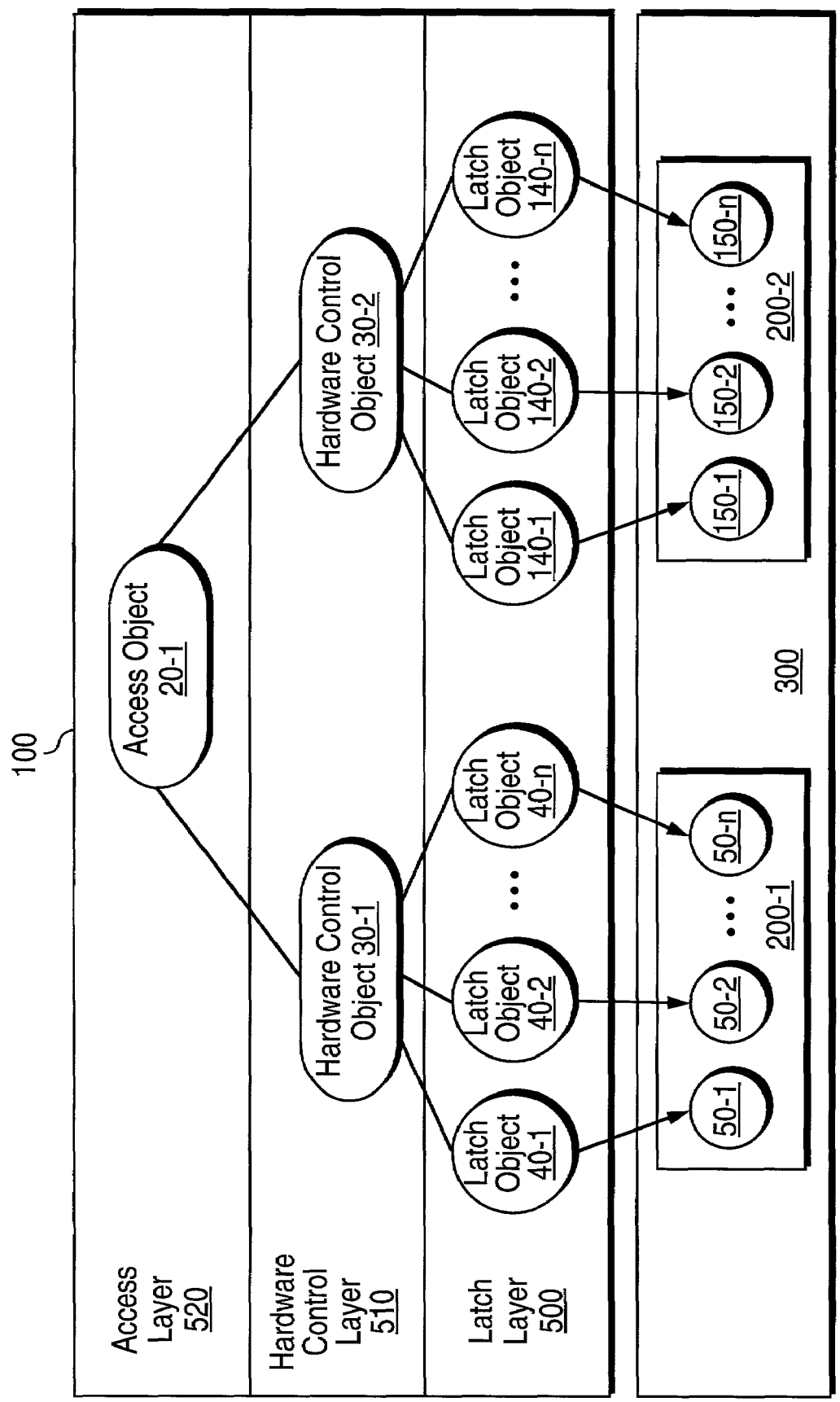
FIG. 2 shows another embodiment of a software system according to the present teachings which includes an access object for grouping hardware control objects.

FIG. 2 shows another embodiment of the software system 100 according to the present teachings. The software system 100 in this embodiment controls the hardware subsystem 200-1 along with a hardware subsystem 200-2 each of which is a sub-portion of a hardware system 300. The hardware subsystem 200-2 includes a set of control points 150-1 through 150-n for controlling its functionality.

As before, the software system 100 includes the hardware control object 30-1 for grouping together the latch objects 40-1 through 40-n which are associated with the control points 50-1 through 50-n of the hardware subsystem 200-1. In this embodiment, the hardware control layer 510 of the software system 100 includes a hardware control object 30-2 for grouping together a set of latch objects 140-1 through 140-n which are associated with the control points 150-1 through 150-n of the hardware subsystem 200-2.

The latch objects 140-1 through 140-n encapsulate accesses to the control points 150-1 through 150-n, respectively, in a manner substantially similar to that described with respect to the latch objects 40-1 through 40-n. The hardware control object 30-2 encapsulates and provides a common interface to the functionality of the hardware subsystem 200-2 in a manner substantially similar to that described with respect to the hardware control object 30-1.

The software system 100 in this embodiment includes an access layer 520 having an access object 20-1 that encapsulates and coordinates accesses to the hardware subsystems 200-1 and 200-2 in response to requests for specific hardware actions from higher levels of the software system 100. The access object 20-1 implements methods that coordinate the hardware functions associated with the hardware control objects 30-1 and 30-2. In this context, the access object 20-1 groups together the hardware subsystems 200-1 and 200-2. The grouping may be based upon interdependencies among hardware subsystems 200-1 and 200-2.

Consider an example in which the subsystem 200-1 controls the frequency of a waveform and the subsystem 200-2 attenuates the waveform and in which there is a dependancy between the frequency of the waveform and the amount of attenuation. Code in the access object 20-1 may call the methods of the hardware control object 30-2 to obtain an attenuation setting from the subsystem 200-2, determine an appropriate frequency setting according to an interdependency, and then call the methods of the hardware control object 30-1 to set the frequency of the waveform accordingly.

Figure 3:
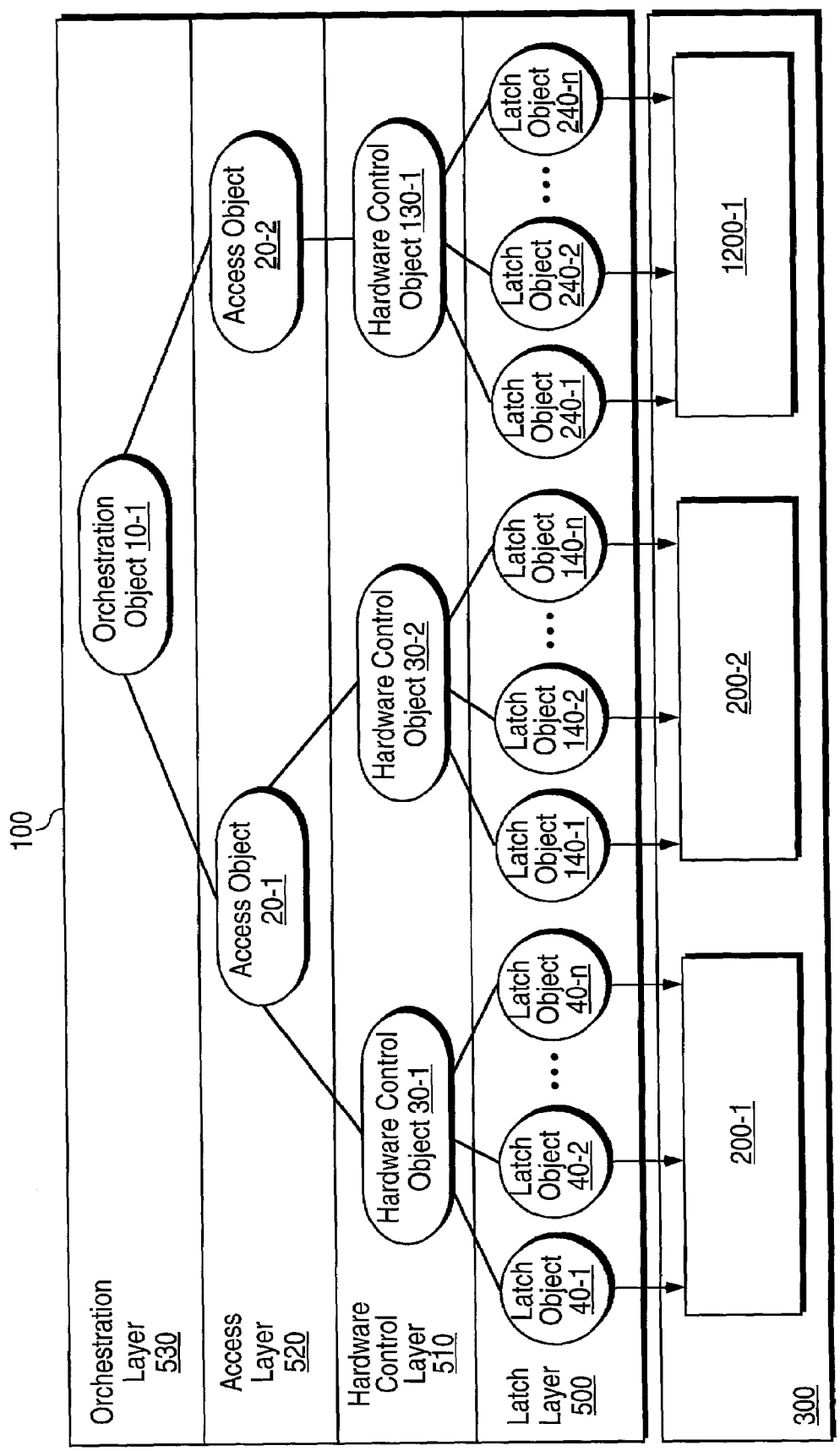
FIG. 3 shows yet another embodiment of a software system according to the present teachings which includes an orchestration object for grouping access objects.

FIG. 3 shows yet another embodiment of the software system 100 according to the present teachings. The software system 100 in this embodiment controls the hardware subsystems 200-1 and 200-2 along with a hardware subsystem 1200-1. The hardware subsystems 200-1 and 200-2 and the hardware subsystem 1200-1 are each a sub-portion of the hardware system 300.

As before, the software system 100 includes the hardware control objects 30-1 and 30-2 for providing a common interface to the latch objects 40-1 through 40-n and the latch objects 140-1 through 140-n, respectively. Similarly, the software system 100 includes the access object 20-1 for grouping together the hardware control objects 30-1 and 30-2. In this context, the access object 20-1 groups together and provides a common interface to the functionality of the hardware subsystems 200-1 and 200-2.

In this embodiment, the software system 100 includes a hardware control object 130-1 for grouping together a set of latch objects 240-1 through 240-n which are associated with a set of corresponding control points of the hardware subsystem 1200-1. The software system 100 in this embodiment includes an access object 20-2 that encapsulates, provides a common interface to, and coordinates accesses to the hardware subsystem 1200-1.

The hardware control objects 30-1, 30-2 and 130-1 of the hardware control layer 510 may be viewed as sharing a similar responsibility in that they coordinate latch objects. The access objects 20-1 and 20-2 of the access layer 520 may be viewed as sharing a similar responsibility in that they coordinate hardware control objects.

The software system 100 in this embodiment includes an orchestration layer 530 having an orchestration object 10-1 for grouping together and providing a common interface to the access objects 20-1 and 20-2. The grouping of the access objects 20-1 and 20-2 may be based on interdependencies in the functionality of their underlying hardware subsystems. The grouping of the access objects 20-1 and 20-2 may define a functional feature of the hardware system 300. The orchestration object 10-1 may implement methods that provide higher level feature-based functionality which is substantially independent of the underlying hardware system 300. In one embodiment, the orchestration object 10-1 is an object implemented as a $C^{++}$ class having data that includes pointers to the access objects 20-1 and 20-2.

Consider an example in which the hardware system 300 generates a waveform, the hardware subsystem 200-1 controls the frequency of the waveform and the hardware subsystem 200-2 attenuates the waveform and in which the hardware subsystem 1200-1 conditions the waveform. In this context, the access object 20-1 encapsulates the functions in the software system 100 that are involved in generating the source waveform and the access object 20-2 encapsulates the functions that are involved in conditioning the waveform. The orchestration object 10-1 calls methods in the access object 20-1 to control the generation of the source waveform and calls methods in the access object 20-2 to control the conditioning of the source waveform.

The hardware system 300 and its sub-portions—the hardware subsystems 200-1, 200-2, and 1200-1 may be embodied in a variety of arrangements. For example, the hardware system 300 may be a circuit board or module and the hardware subsystems 200-1 and 200-2 and 1200-1 may be separate circuits contained on it. In another example, the hardware subsystems 200-1 and 200-2 and 1200-1 may be separate sub-circuits of a larger circuit that is the hardware system 300. In yet another example, the hardware subsystems 200-1 and 200-2 and 1200-1 may be separate modules or circuit boards contained within a rack mounted hardware system 300. The control points of the hardware subsystems 200-1, 200-3, and 1200-1 may be implemented as registers or digital-to-analog converters, etc., or any combination of these.

The hierarchical arrangement of the hardware system 300 and the hardware subsystems 200-1, 200-2, and 1200-1 and the control points in the hardware subsystems 200-1, 200-2, and 1200-1 correspond to the hierarchical arrangement of the access objects 20-1 and 20-2, the hardware control objects 30-1, 30-2, and 130-1, and the latch objects 40-1 through 40-n, 140-1 through 140-n, and 240-n through 240-n. Changes that encompass a grouping of hardware subsystems are handled by changes to a corresponding access object and below. Changes that encompass a hardware subsystem are handled by changes to a corresponding hardware control object and below. Changes that encompass a control point are handled by changes to a corresponding latch object.

For example, the software system 100 adapts to a modification or replacement of the hardware subsystems 200-1 and 200-2 with a modification or replacement of the access object 20-1. The software system 100 adapts to a modification or replacement of the hardware subsystem 200-1 with a modification or replacement of the hardware control object 30-1. The software system 100 adapts to a modification or replacement of the control point 50-1 with a modification or replacement of the latch object 40-1. The modification to a object may include modifications to its data and/or its methods.

Figure 4:
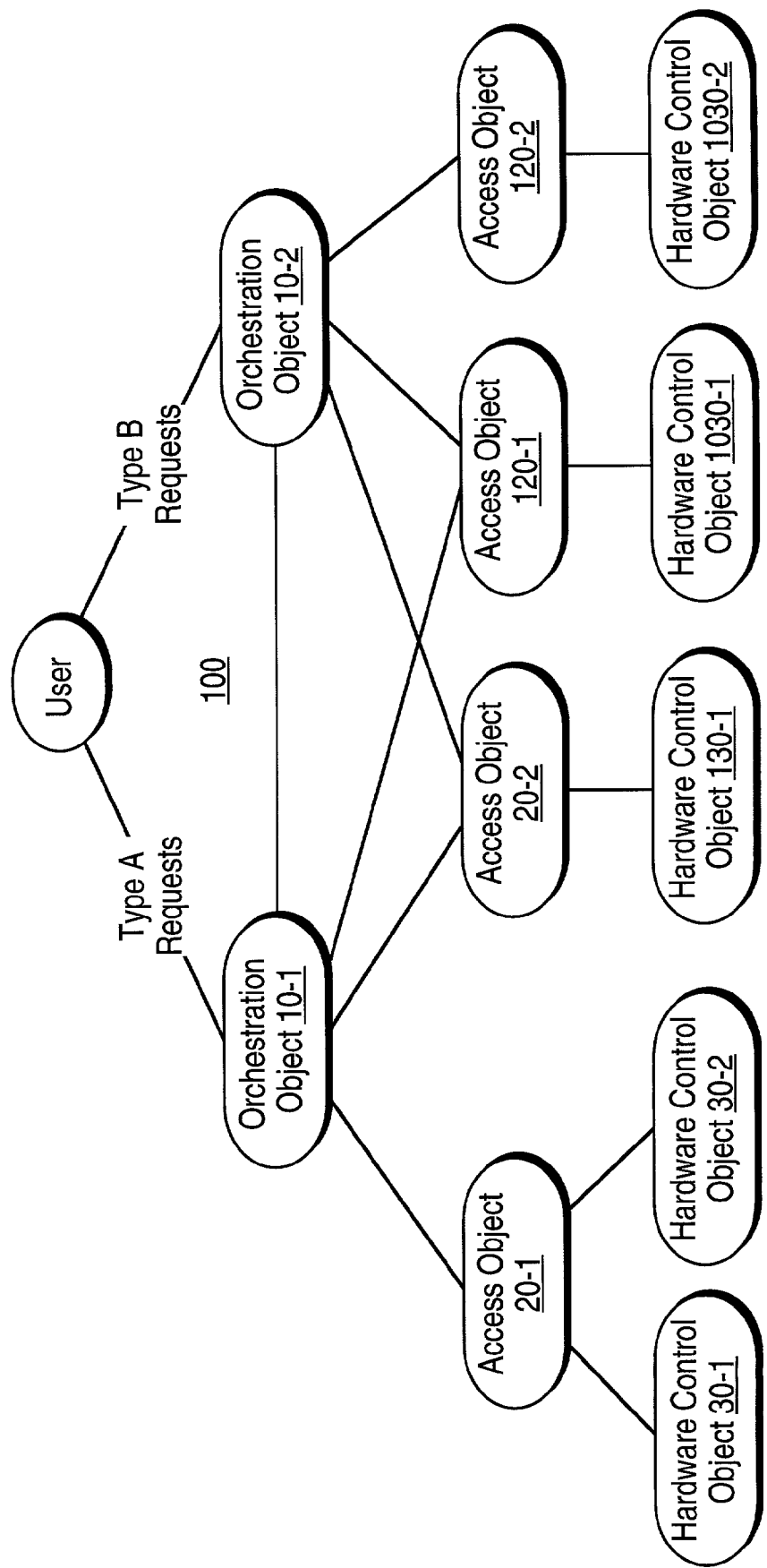
FIG. 4 shows still another embodiment of a software system according to the present teachings.

FIG. 4 shows still another embodiment of the software system 100 according to the present teachings. The software system 100 in this embodiment includes the orchestration object 10-1, the access objects 20-1 and 20-2, and the hardware control objects 30-1, 30-2, and 130-1 along with corresponding latch objects for controlling the hardware subsystems 200-1, 200-2 and 1200-1.

In this embodiment, the software system 100 includes a hardware control object 1030-1 and an access object 120-1 for a corresponding hardware subsystem and a hardware control object 1030-2 and an access object 120-2 for a corresponding hardware subsystem and an orchestration object 10-2 for grouping the access objects 120-1 and 120-2.

The orchestration object 10-1 handles requests from a user which are associated with a type A function feature of the hardware system 300 and the orchestration object 10-2 handles requests from the user which are associated with a type B function feature of the hardware system 300. Consider an example in which the orchestration object 10-1 uses the access objects 20-1 and 20-2 to control the frequency of a waveform and the orchestration object 10-2 uses the access objects 120-1 and 120-2 to control the amplitude of the waveform. In this context, type A functional features are frequency related and type B functional features are amplitude related. The orchestration object 10-1 may include a method that takes as an argument a frequency value and the orchestration object 10-2 may have a method that takes as an argument an amplitude value.

Each latch object is controlled by only one hardware control object and each hardware control object is controlled by only one access object whereas multiple orchestration objects can control each access object. In addition, orchestration objects can control other orchestration objects. This enables an access object to handle conflicts in the control undertaken by their orchestration objects. For example, the access objects 20-2 and 120-1 are each contained in both the orchestration objects 10-1 and 10-2. If the orchestration object 10-1 undertakes to generate a frequency of 500 MHZ and the orchestration object 10-2 undertakes to set an amplitude of 10 V then either the access object 20-2 or the access object 120-1 may determine that the corresponding hardware is only capable of 5 V and 500 MHZ and take appropriate action to apply these constraints.

No communication is allowed between access objects. This forces all requests to be coordinated by an orchestration object. Similarly, no communication is allowed between hardware control objects.

In some embodiments, communication is allowed between orchestration objects. For example, the orchestration object 10-1 communicates to the orchestration object 10-2 that it is changing the frequency of the waveform which is an operation that may require the orchestration object 10-2 to change an operating mode if its underlying hardware.

In one embodiment, the software system 100 includes initialization or boot-up code for detecting the versions of the hardware systems and subsystems installed and for setting the pointers maintained by each orchestration objects to its corresponding access objects and for setting the pointers maintained by each access objects to its corresponding hardware control objects accordingly.

The multi-layer architecture disclosed herein may be used to impose rules on the laying out of control of hardware systems including embedded systems. These rules provide clarity and consistency in generating new control algorithms for a system as well as maintenance of a system.

The orchestration layer enables the implementation of high-level, feature-based algorithms in which there is little need for knowledge of the underlying hardware system. The access layer provides for encapsulation of hardware function circuits and enables implementation of control which is specific to the underlying circuitry. The access layer provides an application programming interface (API) to the underlying circuitry and enables use of the underlying circuit functionality without specific knowledge of the design of the underlying circuitry. The hardware control layer is provided to abstract the specific digital interface to the underlying circuitry from the access layer. Minor changes to a portion of underlying circuitry may be changed while not affecting the access layer. For example, the resolution of a control DAC may be changed with a corresponding change to the code in the hardware control layer while not affecting the code in the access layer The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A software system, comprising:
   latch layer having a latch object for each of a set of control points of a hardware system, each latch object providing a common interface in the software system for accessing the corresponding control point and each latch object providing a locking mechanism around a physical address associated with the corresponding control point; and
   hardware control layer having a hardware control object for each of a set of sub-portions of the hardware system, each hardware control object for coordinating accesses to the control points of the corresponding sub-portion through the latch layer.

2. The software system of claim 1, wherein each latch object is controlled by only one of the hardware control objects.

3. The software system of claim 1, wherein each latch object includes a method which is adapted to alter a value applied to the corresponding control point according to a hardware implementation of the corresponding control point.

4. The software system of claim 1, wherein each hardware control object is adapted to handle interdependencies among the corresponding control points.

5. The software system of claim 1, further comprising an access layer having an access object for each of a set of groupings of the sub-portions, each access object coordinating accesses to the corresponding grouping of the sub-portions.

6. The software system of claim 5, wherein each access object is adapted to handle interdependencies among the sub-portions of the corresponding grouping of the sub-portions.

7. The software system of claim 5, wherein each hardware control object is controlled by only one of the access objects.

8. The software system of claim 5, further comprising an orchestration layer having an orchestration object for each of a set of functional features of the hardware system, each orchestration object providing a common interface in the software system for accessing a corresponding grouping of the access objects which are associated with the corresponding functional feature.

9. The software system of claim 8, wherein each orchestration object is adapted to handle interdependencies among the access objects of the corresponding grouping of the access objects.

10. The software system of claim 8, wherein each access object is controlled by one or more of the orchestration objects.

11. The software system of claim 8, wherein each orchestration object controls one or more of the other orchestration objects.

12. A method for controlling a hardware system using a software system, comprising:
   providing a latch object in the software system for each of a set of hardware control points of the hardware system, each latch object providing a common software interface enabling the software system to access the corresponding hardware control point including a locking mechanism around a physical address associated with the corresponding hardware control point; and
   coordinating accesses to the latch objects for the hardware control points of each of a set of sub-portions of the hardware system.

13. The method of claim 12, wherein providing a latch object includes providing a method which is adapted to alter a value applied to the corresponding hardware control point according to a hardware implementation of the corresponding hardware control point.

14. The method of claim 12, wherein coordinating accesses includes coordinating interdependencies among the hardware control points.

15. The method of claim 12, wherein coordinating accesses includes coordinating accesses among a set of groupings of the sub-portions.

16. The method of claim 15, wherein coordinating accesses further includes coordinating interdependencies among the sub-portions of the corresponding groupings of the sub-portions.

17. The method of claim 15, wherein coordinating accesses further includes coordinating accesses associated with each of a set of functional features of the hardware system.

* * * * *